US007591133B2

(12) United States Patent
Wright

(10) Patent No.: US 7,591,133 B2
(45) Date of Patent: Sep. 22, 2009

(54) ACTUATOR SYSTEM HAVING A VALVE MANIFOLD

(76) Inventor: John J. Wright, 9 Hix Ave., Rye, NY (US) 10580

( * ) Notice: Subject to any disclaimer, the term of this patent is extended or adjusted under 35 U.S.C. 154(b) by 187 days.

(21) Appl. No.: 11/325,370

(22) Filed: Jan. 3, 2006

(65) Prior Publication Data

US 2007/0151235 A1 Jul. 5, 2007

(51) Int. Cl.
*F16D 31/02* (2006.01)

(52) U.S. Cl. .............................. 60/402; 60/404; 60/417

(58) Field of Classification Search ........... 60/402-406, 60/417; 137/884

See application file for complete search history.

(56) References Cited

U.S. PATENT DOCUMENTS 3,806,088 A * 4/1974 Stoneman et al. ........... 137/884
4,757,684 A 7/1988 Wright
5,087,846 A 2/1992 Wright
5,205,200 A 4/1993 Wright
5,275,193 A 1/1994 Wright
5,301,505 A 4/1994 Wright
D479,576 S 9/2003 Wright

* cited by examiner

*Primary Examiner*—F. Daniel Lopez
(74) *Attorney, Agent, or Firm*—Collard & Roe, P.C

(57) ABSTRACT

A block manifold for a fail safe actuator system allows the actuator operation with a hand pump if electrical power were not available. A method is available to isolate fail safe solenoid valves and an accumulator from a hand pump circuit to relieve the stored energy from the fail safe circuit. An additional set of pilot operated check valves were installed between the motor driven pump circuit and the hand pump circuit. These pilot operated check valves isolated the hand pump circuit from the fail safe dump solenoid and accumulator. These pilot actuated check valves also hold the actuator in the fail safe position as long as the hand pump system was not used. There is also a hydraulic bleed circuit to relieve the accumulator stored energy when the hand pump system was used.

35 Claims, 6 Drawing Sheets

ACTUATOR SYSTEM HAVING A VALVE MANIFOLD

BACKGROUND OF THE INVENTION

1. Field of the Invention

The present invention relates generally to a fail safe hydraulic actuator system which is linear or rotary and is capable of returning an externally associated valve to its fail safe or inoperative position in the event of loss of electrical power to the system.

Even though the loss of electrical power is maintained, the improved manifold block of the present invention enables one to operate a manual 4 way valve and a hand pump to open the fail safe closed valve that would otherwise remain closed as long as the electrical power is unavailable to the system.

2. The Prior Art

Linear actuators with piston means displaced by fluid or air pressure are typically used to control the opening and closing of valves, e.g., gate valves, globe valves, sluice gates and cone valves.

Many situations exist where electrically operated control mechanisms, such as the valves just noted, and the like, if locked in an operative position by an interruption of electric power, can create awkward, difficult, and even hazardous conditions.

The Wright U.S. Pat. No. 5,301,505 discloses a fail safe hydraulic actuator system, particularly one featuring a linear actuator, which upon loss of electric power instantly and automatically returns the control mechanism which is being monitored to the inoperative or closed position.

Other examples of fail safe electrical actuator systems include the following:

| Patentee | U.S. Pat. No. | Date |
|---|---|---|
| Wright | 4,757,684 | Jul. 19, 1988 |
| Wright | 5,087,846 | Feb. 11, 1992 |
| Wright | 5,205,200 | Apr. 27, 1993 |
| Wright | 5,275,193 | Jan. 4, 1994 |
| Wright | Des 479,576 | Sep. 9, 2003 |

All of these prior art documents and disclosures are each herewith incorporated by reference.

However, each of these prior art structures and systems has the disadvantage that as long as the power failure exists, that it is not possible to use a hand pump manual valve structure to activate the linear actuator to move in such a direction as to open the closed valve which was closed as part of the automatic fail safe procedure and fail safe system.

SUMMARY OF THE INVENTION

It is an object of the present invention to provide a fail safe linear actuator system or rotary actuator system that is operable even during an electrical power failure by means of a manual or hand pump and a manual 4 way valve in order to open a closed valve and actuator system, during the electrical power failure.

The solution to this prior art problem is to provide a valve manifold that can be used even when there is no electrical power. In the prior art the problem is with the existing systems and structures for the fail safe actuator because none would allow the actuator operation with a hand pump if electrical power was not available. Some persons skilled in the art wanted to be able to operate the actuator when electrical power was not available. The no power option is needed to operate valves during a power failure on an emergency basis. New York City Department of Environmental Protection has requested this modification for their sewage treatment plants.

A method was needed to isolate the fail safe solenoid valves and accumulator from the hand pump circuit and relieve the stored energy from the fail safe circuit. Hence, the solution according to the invention was to have an additional set of pilot operated check valves that were installed between the motor driven pump circuit and the hand pump circuit. These pilot operated check valves isolate the hand pump circuit from the fail safe dump solenoid and accumulator. These pilot actuated check valves also hold the actuator in the fail safe position as long as the hand pump system was not used.

A hydraulic bleed circuit is also installed to relieve the accumulator of stored energy when the hand pump system was used. A port contains a check valve that keeps hydraulic fluid from the hand pump from entering the accumulator during hand pump operation. Another port contains a needle valve to control the draining of the accumulator through the manual directional valve and back into the reservoir.

Therefore, the present invention provides a fail safe linear actuator system or rotary actuator system which includes a pressurized fluid storage means as its fail safe mechanism. The pressurized fluid storage means, e.g., an accumulator, must be capable of delivering fluid to the linear or rotary actuator so that it returns to its inoperative (or closed) position should the linear actuator system suffer a loss of electrical power. Additionally, the pressurized fluid storage means may include a means for signaling the controller of the system when the pressurized fluid storage means has been satisfactorily charged with fluid. Thus, fluid from the reservoir can be prevented from being delivered to the linear actuator until the pressurized fluid storage means has been charged with fluid. There is also a novel and improved block manifold that contains an additional set of pilot operated check valves that are installed between a motor driven pump circuit and a hand pump circuit. This enables the actuator to be operated with the hand pump even if the electrical power is not available.

The present invention is directed to a fail safe actuator system comprising a valve manifold block having several sides with each side of said several sides having openings; fluid flow passageways within said manifold block connecting some of said openings of each side with some of said openings of every other side; an accumulator connected in fluid flow connection to at least one of said openings; an actuator comprising a cylinder containing a moveable piston having an attached piston rod connected to a valve; said actuator cylinder connected in fluid flow connection to others of said openings;

an electrically operated pump motor and a motor-driven pump connected in fluid flow connection to a fluid reservoir and connected in fluid flow connection to a solenoid operated control valve; said solenoid operated control valve connected in fluid flow connection to still other of said openings;

a manually operated hand pump connected in fluid flow connection to said reservoir and to a manual 4 way valve; said manual 4 way valve connected in fluid flow connection to further others of said openings; and a set of pilot operated check valves connected in fluid flow connection to said fluid flow passageways between said motor driven pump and said hand pump; whereby said actuator can be operated with said hand pump if electrical power is not available.

The present invention is also directed to a fail safe actuator system comprising a valve manifold block having a left side and a right side, said left side having left side openings, and said right side having right side openings; said manifold block having a front side having front side openings; said manifold block having a rear side having rear side openings; said manifold block having a top side having top side openings; and said manifold block having a bottom side having bottom side openings; fluid flow passageways within said manifold block connecting some of said left side openings with some of said right side openings; an accumulator connected in fluid flow connection to a right side opening; an actuator comprising a cylinder containing a moveable piston having an attached piston rod connected to a valve; said actuator cylinder connected in fluid flow connection to some of said left side openings; said fluid flow passageways within said manifold block connecting some of said front side openings with some of said rear side;

an electrically operated pump motor and a motor driven pump connected in fluid flow connection to a fluid reservoir and connected in fluid flow connection to a solenoid operated control valve; said solenoid operated control valve connected in fluid flow connection to other of said openings; a manually operated hand pump connected in fluid flow connection to said reservoir and to a manual 4 way valve; said manual 4 way valve connected in fluid flow connection to another of said openings; and a set of pilot operated check valves connected in fluid flow connection to said fluid flow passageways between said motor driven pump and said hand pump; and a source of electrical power; whereby said actuator can be operated with said hand pump if electrical power is not available.

BRIEF DESCRIPTION OF THE DRAWINGS

Other and further objects, advantages and features of the present invention will be understood by reference to the following specification in conjunction with the annexed drawings.

It is to be understood that these drawings are for the purpose of illustration only and do not limit the scope of the invention in any manner thereof. In the drawings wherein the same reference characters denote the same structural features throughout the several views.

DETAILED DESCRIPTION OF PREFERRED EMBODIMENTS

Figure 1:
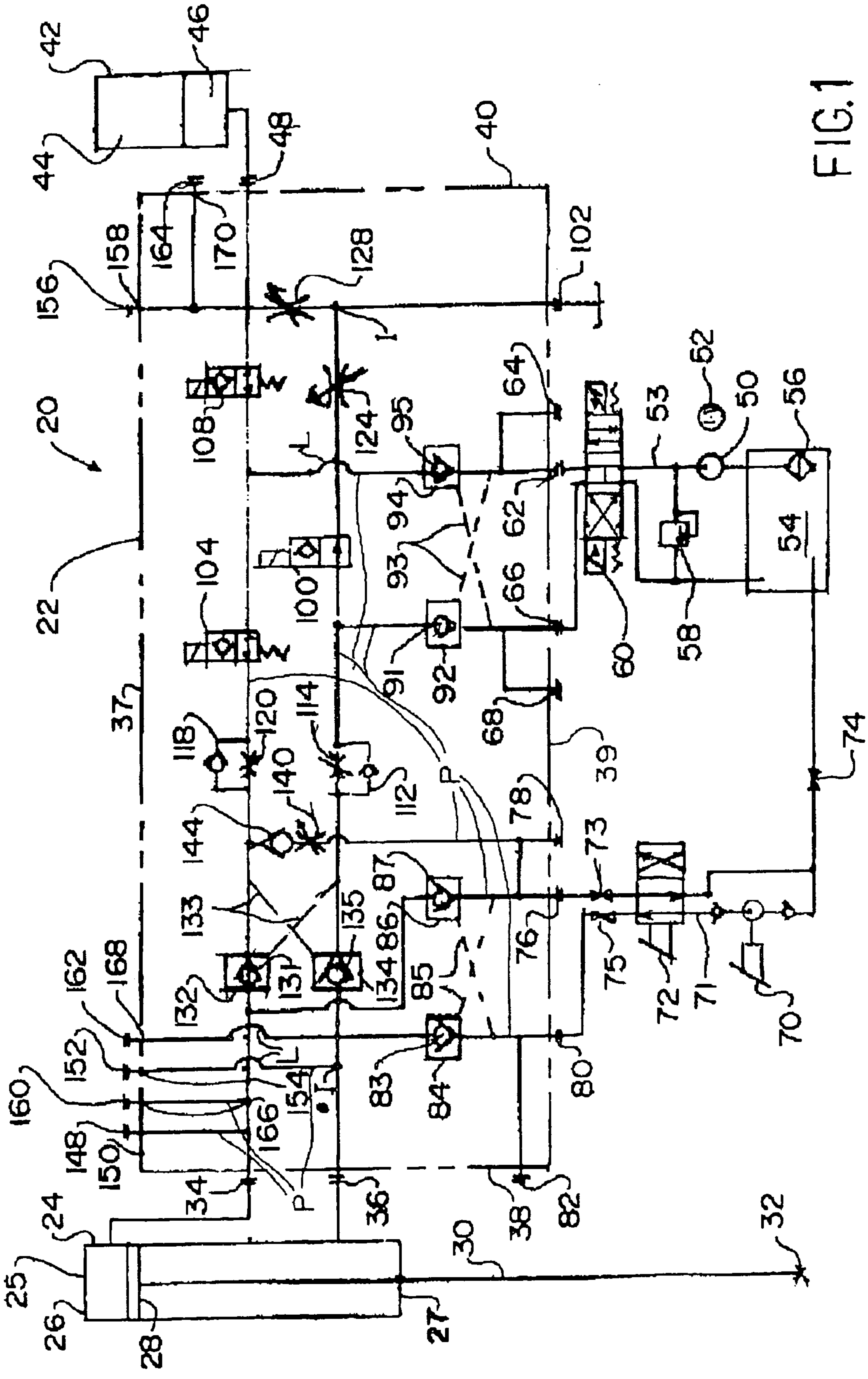
FIG. 1 shows a fluid circuit diagram for the fail safe linear actuator system of the invention.

Turning now in detail to the drawings, FIG. 1 shows a fluid circuit diagram for the fail safe linear actuator system 20 of the present invention.

Figure 2:
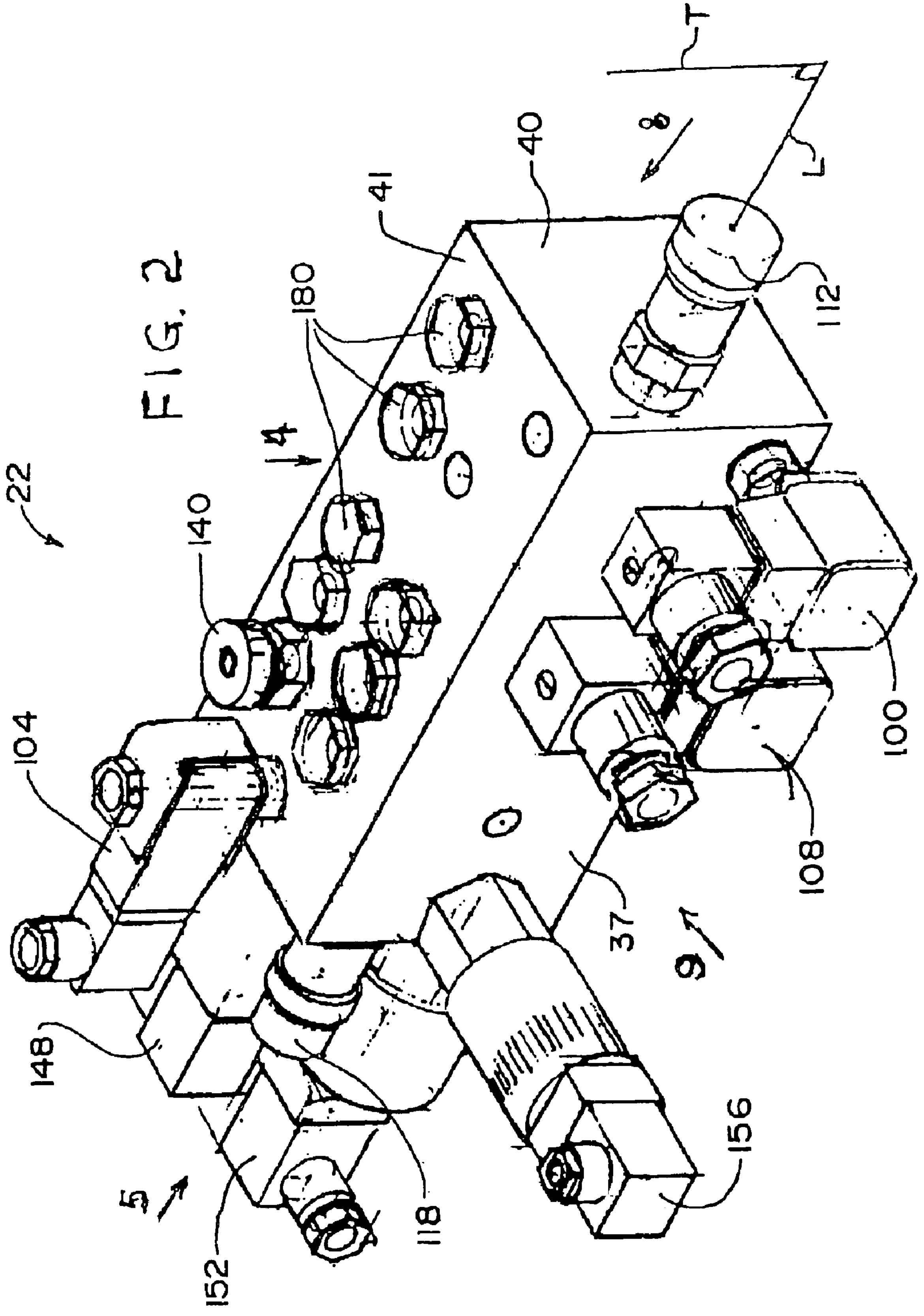
FIG. 2 shows a front perspective view of the manifold block of the actuator system of the invention with certain switches and valves being installed.
Figure 3:
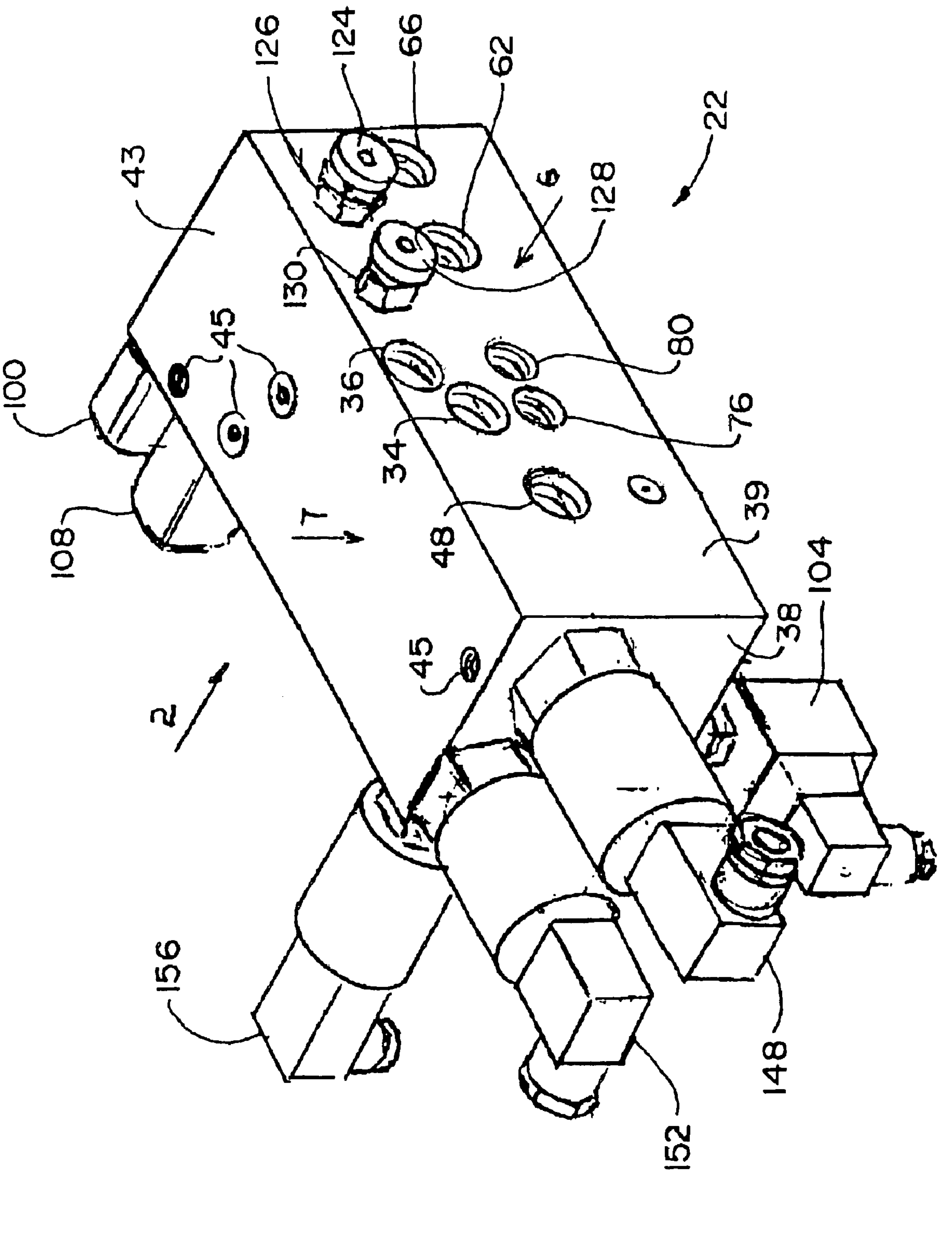
FIG. 3 shows a side perspective view of the manifold block of the actuator system of the invention with certain switches and valves being attached.

The manifold block 22 which is shown in perspective in FIGS. 2 and 3, is shown in FIG. 1 in the position of the dashed lines. The linear actuator 24 is a cylinder containing a piston 28 and having a connected piston rod 30 which is attached to a valve 32. This actuator is coupled to the manifold block 22 at openings 34 and 36 at the side or end 38 of the manifold block. At the other side or end 40 of the manifold block, the accumulator 42 containing nitrogen gas 44 and a liquid or hydraulic fluid 46 under pressure is attached at opening 48 to the manifold block.

Figure 1A:
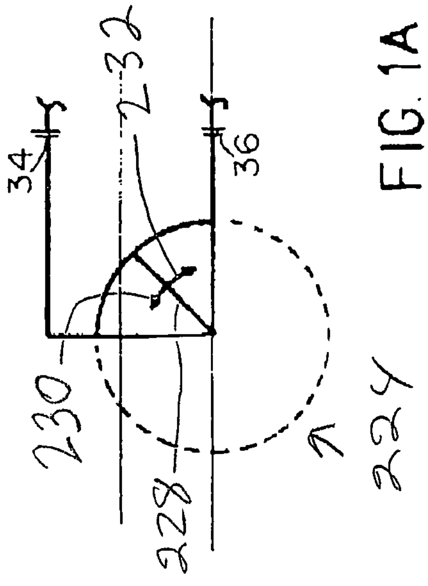
FIG. 1A shows the application in part of the fluid circuit diagram of FIG. 1 to a rotary actuator system of the invention.

In FIG. 1A is shown the rotary actuator 224 which is a cylinder containing a rotary piston 228 and having a connected piston rod 30 shown in FIG. 1 which is attached to a valve 32. For the sake of brevity FIG. 1 is not repeated in its entirety in showing FIG. 1A, since only the difference in structure is illustrated. The remainder of FIG. 1A is the same as is shown in FIG. 1. In operating the rotary actuator 224, rotation in the counterclockwise direction 230 will open the valve 32. In operating the rotary actuator 224, rotation in the clockwise direction 232 will close the valve 32.

Figure 6:
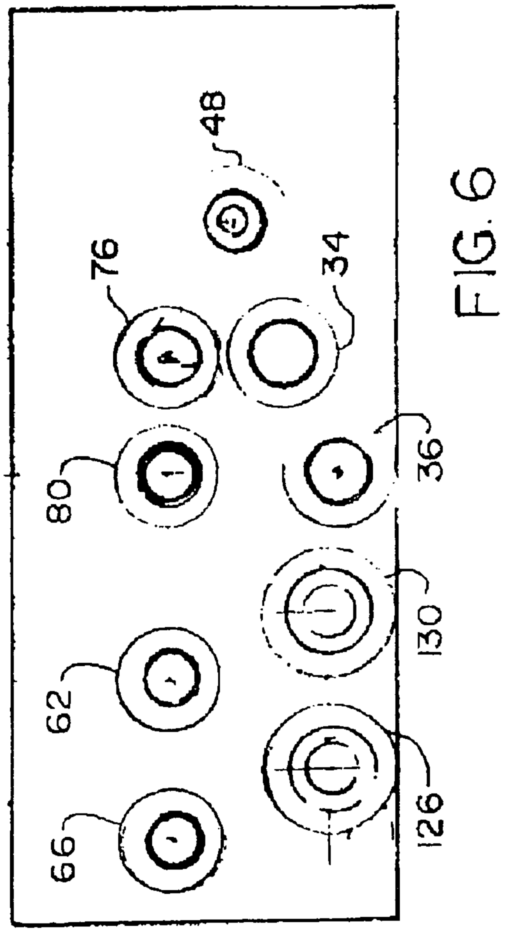
FIG. 6 shows a bottom side view of the manifold block in the direction of arrow 6 of FIG. 3 without any switches or valves being attached.

Connection openings or ports 34 and 36 are also shown in FIGS. 3 and 6. Connection opening or port 48 is also shown in FIGS. 3 and 6.

The motorized pump 50 with pump motor 52 is connected to the hydraulic fluid reservoir 54 through filter 56 and to the relief valve 58 and to the solenoid operated control valve 60 which is 3 position and 4 way. This constitutes the motor driven pump circuit subassembly, which is attached to the manifold block at openings or ports 62, 64 and 66, 68. Connection openings 62 and 66 are also shown in FIGS. 3 and 6.

The hand pump 70 and the manual 4 way valve 72 and the manual isolation valves 74 are connected together to the reservoir 54 to create the hand pump circuit subassembly. There are also manual isolation valves 73 and 75 connecting manual 4 way valve 72 to opening 76 or 80 respectively. This subassembly is connected to the manifold block at openings or ports 76, 78 and 80, 82. Connection openings 76 and 80 are also shown in FIGS. 3 and 6.

Figure 4:
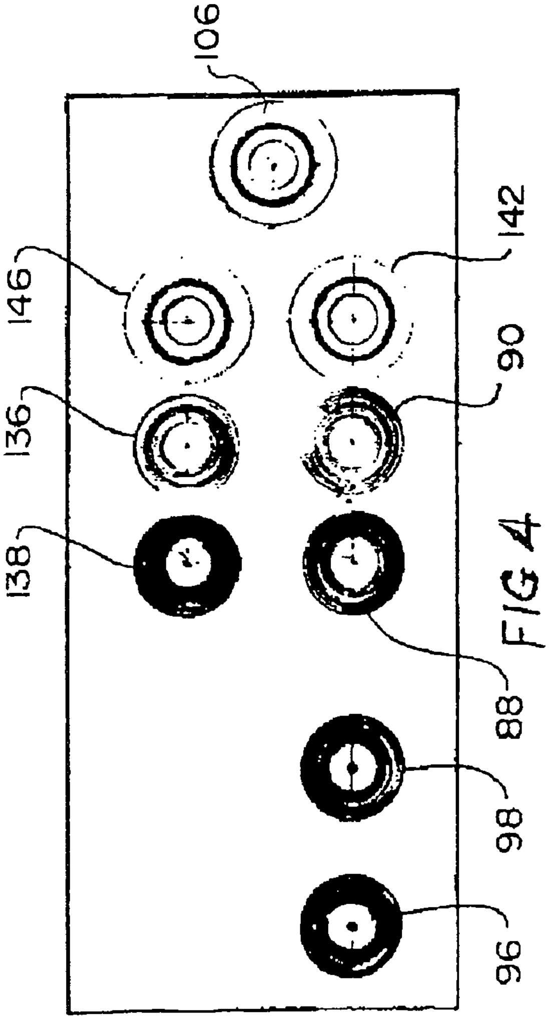
FIG. 4 shows a front side view of the manifold block in the direction of arrow 4 of FIG. 2 without any switches or valves being attached.

The manifold block has various components attached thereto which function as follows. Hand pump driven pilot operated check valves are components 84 and 86. These two pilot operated check valves 84 and 86 work together during the hand pump operation to allow hydraulic fluid flow into and out of the cylinder. Check values 84 and 86 are connected as shown in FIG. 4 to the block manifold at connection openings 88 and 90 respectively.

As shown in FIG. 1, the valve manifold block has several sides such as sides 37, 38, 39 and 40. Each of these sides has connection openings or ports. Thus, side 37 has openings or ports 150, 154, 166, 168 and 158. Side 38 has openings or ports 34, 36 and 82. Side 39 has openings or ports 62, 64, 66, 68, 76, 78 and 80. Side 40 has openings or ports 48 and 170. Within the manifold block are passageways P which connect together some or all of the openings of each side with some or all of the openings of every other side of the manifold block.

Being in fluid flow connection means that the hydraulic fluid can flow from one element or component of the fail safe actuator system to another element or component of the fail safe actuator system through the fluid flow passageways, P, as shown in FIG. 1. These components include the accumulator, the actuator, the reservoir, the motor pump, the solenoid operated control valve, the manual isolation valves, the hand pump, the manual 4 way valve, various pilot operated check valves, the accumulator valve, the blocker valve and the dump valve.

For the sake of convenience, the six sides of the manifold block shown in FIGS. 2 and 3, are described as the right side or end 40 in the direction of arrow 8; the left side or end 38 in the direction of arrow 5; the top side 37 in the direction of arrow 9; the bottom side 39 in the direction of arrow 6; the front side 41 in the direction of arrow 4; and the rear side 43 in the direction of arrow 7.

Motor driven pump pilot operated check valves are components 92 and 94. These two pilot operated check valves 92 and 94 work together during motor driven pump operation to allow hydraulic fluid flow into and out of the cylinder. Check valves 92 and 94 are connected to the block manifold at connection openings 96 and 98 respectively as shown in FIG. 4.

Figure 9:
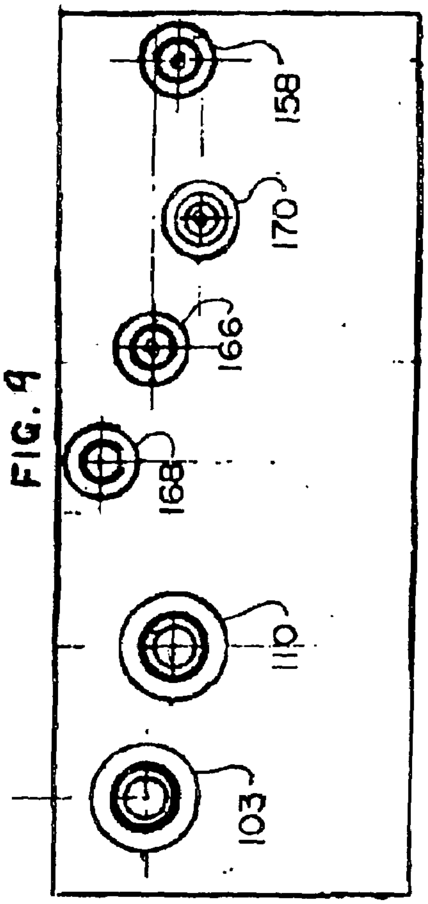
FIG. 9 shows a top side view of the manifold block in the direction of arrow 9 of FIG. 2 without any switches or valves being attached.
Figure 8:
FIG. 8 shows a right side view of the manifold block in the direction of arrow 8 of FIG. 2 without any switches or valves being attached.

Dump solenoid valve is component 100, shown in FIG. 2. This solenoid valve is closed when the electrical power is applied and is open when the electrical power is removed. This solenoid valve 100 opens on the loss of electrical power, allowing a return path for the hydraulic fluid from the bottom of the cylinder to the reservoir 54. That is this is from port 36 to port 102. Port opening 102 is shown in FIG. 8. Valve 100 is connected to the block manifold at connection opening 103 as shown in FIG. 9.

Blocker solenoid valve is component 104, shown in FIGS. 2 and 3. This solenoid valve 104 is closed when the electrical power is applied and is open when the electrical power is removed. This solenoid valve 104 is powered and is closed when charging the accumulator 42 to block the flow of hydraulic fluid to the cylinder 24. Blocker solenoid valve 104 is connected to the block manifold at connection opening 106 as shown in FIG. 4.

Accumulator solenoid valve is component 108 shown in FIGS. 2 and 3. This solenoid valve 108 is closed when the electrical power is applied and is open when the electrical power is removed. This solenoid valve 108 opens on loss of electrical power, allowing the flow of hydraulic fluid from the accumulator 42 to the top of the cylinder 26 through port 34. Accumulator Valve 108 is connected to the block manifold at connection opening 110 as shown in FIG. 9.

Flow control valve for rod retraction is component 112. This flow control valve 112 is shown in FIG. 2 and allows full flow to the top of the cylinder through port 34 and has a variable restriction 114 on the flow out of the cylinder. Restricting the flow out of the cylinder prevents the cylinder piston 28 from being pushed faster than intended by the load on the cylinder rod. Flow control valve 112 is connected to the block manifold at connection opening or port 116 as shown in FIG. 8.

Figure 5:
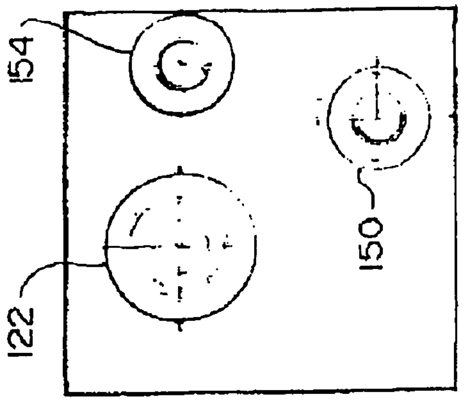
FIG. 5 shows a left side view of the manifold block in the direction of arrow 5 of FIG. 2 without any switches or valves being attached.

Flow control valve for rod extension is component 118. This flow control valve 118 is shown in FIG. 2 and allows full flow to the bottom of the cylinder port 36 and has a variable restriction 120 on the flow out of the cylinder. Restricting the flow out of the cylinder prevents the cylinder piston from being pushed faster than intended by the load on the cylinder rod. Flow control valve 118 is connected to the block manifold at connection opening or port 122 as shown in FIG. 5.

Accumulator flow control valve is component 124. This flow control valve 124 is shown in FIG. 3 and restricts the flow out of the cylinder during accumulator actuation. When the accumulator solenoid 108 and the dump solenoid 100 are de-energized, the hydraulic fluid stored under pressure in the accumulator is sent to the top of the cylinder. The hydraulic fluid forced from the bottom of the cylinder is slowed by this flow control valve 124 to attain the required operating speed of the cylinder. Accumulator flow control valve 124 is connected to the block manifold at connection opening or port 126 as shown in FIGS. 3 and 6.

Accumulator drain valve is component 128. This valve 128 is shown in FIG. 3 and is used to drain the stored energy from the accumulator 42 for servicing. Accumulator drain valve 128 is connected to the block manifold at connection opening or port 130 as shown in FIGS. 3 and 6.

Loss of power isolation pilot operated check valves are components 132 and 134. These pilot operated check valves 132 and 134 are used with the hand pump during power failures. They prevent the flow of hydraulic fluid from going into the accumulator 42 or returning to the reservoir 54 through the dump solenoid 100. Check valves 132 and 134 are connected to the block manifold at connection openings or ports 136 or 138 respectively, as shown in FIG. 4.

Loss of power accumulator drain valve is component 140. This valve 140 is shown in FIG. 2 and allows the slow release of the stored energy in the accumulator 42 when the hand pump 70 is used during loss of electrical power. During the electrical power loss, the accumulator solenoid 108 is open applying hydraulic pressure to the top of the cylinder. This pressure prevents the hand pump 70 from retracting the cylinder rod 30. Valve 140 is connected to the block manifold at connection opening or port 142 as shown in FIG. 4.

Loss of power check valve is component 144. This check valve 144 prevents the hydraulic fluid flow from the hand pump 70 from going into the accumulator 42 during rod extend operation. Check valve 144 is connected to the block manifold at connection opening or port 146 as shown in FIG. 4.

Rod extend pressure switch is component 148. This adjustable pressure switch 148 is shown in FIGS. 2 and 3 and shuts off the motor driven pump 50 at the desired pressure. This pressure is determined by the operating load on the cylinder during rod extension. Switch 148 is connected to the block manifold at connection opening or port 150 as shown in FIG. 5.

Rod retract pressure switch is component 152. This adjustable pressure switch 152 is shown in FIGS. 2 and 3 and shuts off the motor driven pump 50 at the desired pressure. This pressure is determined by the operating load on the cylinder during rod retraction. Switch 152 is connected to the block manifold at connection opening or port 154 as shown in FIG. 5.

Accumulator pressure switch is component 156. This adjustable pressure switch 156 is shown in FIGS. 2 and 3 and shuts off the motor driven pump 50 at the desired pressure. This pressure is determined by the pressure required in the accumulator 42. Switch 156 is connected to the block manifold at connection opening or port 158 as shown in FIG. 9.

Pressure gauges 160, 162 and 164 are used to test the pressure in rod extension 160, or rod retraction 162, and accumulator 164 circuits. Pressure gauges 160, 162 and 164 are connected to the block manifold at connection openings or ports 166, 168 and 170, respectively, as shown in FIG. 9.

The prior art problem was solved by using the improved valve manifold of the present invention which will function even if there is no electrical power to operate the manifold.

The previous manifold for the fail safe prior art actuator shown in U.S. Design Patent No. 479,576, would not allow the actuator operation with the hand pump if electrical power were not available. Some skilled in the art wanted to operate the actuator when electrical power was not available.

A method was discovered to isolate the fail safe solenoid valves and accumulator from the hand pump circuit and relieve the stored energy from the fail safe circuit, as being within the present invention.

This prior art problem was solved according to the present invention by providing an additional set of pilot operated check valves 132 and 134 which are installed between the motor driven pump circuit 53 and the hand pump circuit 71. These pilot operated check valves isolate the hand pump circuit 71 from the fail safe dump solenoid 100 and accumulator 42. These pilot actuated check valves also hold the actuator 24 in the fail safe position as long as the hand pump system was not used.

Also installed according to the present invention is a hydraulic bleed circuit to relieve the accumulator 42 stored energy when the hand pump circuit 71 was used. Check valve 144 keeps hydraulic fluid from the hand pump 70 from entering the accumulator 42 during hand pump operation. Check valve 144 is connected to a needle valve 140 to control the draining of the accumulator 42 through the manual isolation valve and back into the reservoir 54.

The procedure and steps for carrying out the method of the present invention will now be discussed.

Sequence of Operation [No Power Option Manifold]

Accumulator charging:

When electrical power from source 182 is applied to actuator 24 through electrical connector 172 and control panel 174 (see FIG. 10) and the accumulator pressure is lower than the setting on the accumulator pressure switch 156 the following steps occur:

- Motor driven pump 50 starts;
- Solenoid operated control valve shifts; connecting manifold port 66 to the reservoir 54 and port 62 to the hydraulic pump discharge;
- Blocker solenoid valve 104 closes;
- Hydraulic fluid flows though port 62;
- Hydraulic fluid opens and passes through pilot operated check valve 94;
- Hydraulic fluid 46 opens and flows through check valve on accumulator solenoid valve 108;
- Hydraulic fluid 46 enters the accumulator 42 compressing the nitrogen gas 44;
- When the pressure setting on 156 is met, the pressure switch opens and the motor driven pump shuts off and the blocker solenoid valve 104 opens; and
- Accumulator solenoid valve 108 remains closed as long as electrical power is applied to actuator 24; this prevents the accumulator 42 discharging into the cylinder 26.

Cylinder rod extends under normal operation—power is applied to actuator and the following steps occur:

- Blocker solenoid valve 104 remains open [no power is applied];
- Accumulator 42 and Dump solenoid valve 100 remain closed [power is applied to them];
- External command is given to extend rod 30;
- Motor driven pump 50 starts;
- Solenoid operated control valve shifts, connecting manifold port 66 to the reservoir 54 and port 62 to the hydraulic pump discharge;
- Hydraulic fluid flows through the solenoid operated control valve into manifold port 62;
- Hydraulic fluid opens and flows through pilot operated check valve 94;
- Hydraulic pressure from pilot operated check valve 94 unseats the check ball 91 on the pilot operated check valve 92 by flowing through fluid flow passageway 93;
- Hydraulic fluid is prevented from entering the accumulator 42 through the accumulator solenoid check valve due to the pressure being higher in the accumulator;
- Hydraulic fluid flows through components 104 and 118;
- Hydraulic fluid opens and flows through pilot operated check valve 132;
- Hydraulic pressure from pilot operated check valve 132 unseats check ball 135 on pilot operated check valve 134 by flowing through fluid flow passageway 133;
- Hydraulic fluid leaves manifold port 34;
- Hydraulic fluid in FIG. 1 enters top 25 of linear actuator cylinder 26 forcing piston 28 down (rod extension);
- Hydraulic fluid is forced out of the area under the cylinder piston;
- Hydraulic fluid enters manifold port 36;
- In FIG. 1A hydraulic fluid enters rotary actuator 224 and causes rotary piston 228 to close in direction 232;
- Hydraulic fluid passes through pilot operated check valve 134 due to check ball 135 being unseated by pressure from pilot operated check valve 132 by flowing through fluid flow passageway 133;
- Hydraulic fluid passes through flow control valve 112;
- The hydraulic fluid flow can be restricted [slowed] if needed by flow control valve 114;
- Hydraulic fluid passes through pilot operated check valve 92 due to check ball 91 being unseated by pressure from pilot operated check valve 94 by flowing through fluid flow passageway 93;
- Hydraulic fluid leaves manifold through port 66; and
- Hydraulic fluid flows through solenoid operated control valve 60 back to reservoir 54.

Cylinder rod retracts under normal operation—power is applied to actuator and the following steps occur:

- Blocker solenoid valve 104 remains open [no power is applied];
- Accumulator solenoid valve 108 and Dump solenoid valve 100 remain closed [power is applied to them];
- External command is given to extend rod 30;
- Motor driven pump 50 starts;
- Solenoid operated control valve shifts; connecting manifold port 62 to the reservoir and port 66 to the hydraulic pump discharge;
- Hydraulic fluid flows through the solenoid operated control valve 60 into manifold port 66;
- Hydraulic fluid opens and flows through pilot operated check valve 92;
- Hydraulic pressure from pilot operated check valve 92 unseats check ball 95 on pilot operated check valve 94 through fluid flow passageway 93;
- Hydraulic fluid flows through component 112;
- Hydraulic fluid opens and flows through pilot operated check valve 134;
- Hydraulic pressure from pilot operated check valve 134 unseats check ball 131 on pilot operated check valve 132 through fluid flow passageway 133;
- Hydraulic fluid leaves manifold port 36;
- Hydraulic fluid enters bottom 27 of cylinder forcing piston up in FIG. 1 causing rod retraction;
- Hydraulic fluid is forced out of the area on top of the cylinder piston;

Hydraulic fluid enters manifold port 34;

In FIG. 1A hydraulic fluid enters rotary actuator 224 and causes rotary piston 228 to open in direction 230;

Hydraulic fluid passes through pilot operated check valve 132 due to check ball 131 being unseated by pressure from pilot operated check valve 134 through fluid flow passageway 133;zz Hydraulic fluid passes through flow control valve 118;

The hydraulic fluid flow can be restricted [slowed] if needed by flow control valve 120;

Hydraulic fluid passes through blocker solenoid valve 104; this valve is not powered and is open;

Hydraulic fluid is prevented from entering the accumulator 42 through the accumulator solenoid check valve 108 due to the pressure being higher in the accumulator;

Hydraulic fluid passes through pilot operated check valve 94 due to check ball 95 being unseated by pressure from pilot operated check valve 92 through fluid flow passageway 93;

Hydraulic fluid leaves manifold through port 62; and

Hydraulic fluid flows through solenoid operated control valve 60 back to reservoir 54.

Cylinder rod extends under fail safe condition—power is removed from actuator and the following steps occur:

Blocker solenoid valve 104 remains open [no power is applied];

Accumulator solenoid valve 108 and dump solenoid valve 100 open [power is removed from them];

Stored energy in accumulator causes hydraulic fluid flow through components 108, 104 and 118; Hydraulic fluid opens and flows through pilot operated check valve 132;

Hydraulic pressure from pilot operated check valve 132 unseats check ball 135 on pilot operated check valve 134;

Hydraulic fluid leaves manifold port 34;

Hydraulic fluid in FIG. 1 enters top 25 of cylinder in linear actuator forcing piston down [rod extend];

Hydraulic fluid is forced out of the area on bottom 27 of the cylinder piston;

Hydraulic fluid enters manifold port 36;

In FIG. 1A hydraulic fluid enters rotary actuator 224 and causes rotary piston 228 to close in direction 232;

Hydraulic fluid passes through pilot operated check valve 134 due to check ball 135 being unseated by pressure from pilot operated check valve 132 through fluid flow passageway 133;

Hydraulic fluid passes through flow control valve 112;

The hydraulic fluid flow can be restricted [slowed] if needed by flow control valve 114;

Hydraulic fluid passes through dump solenoid 100;

Hydraulic fluid passes through flow control valve 124;

The hydraulic fluid flow can be restricted [slowed] if needed by flow control valve 124; this would be done if emergency closing speed is too fast; and Hydraulic fluid leaves manifold through port 102 and returns to reservoir Cylinder rod retracts using hand pump power is not applied to actuator and the following steps occur:

Blocker solenoid valve 109 remains open [no power is applied];

Accumulator solenoid valve 108 and dump solenoid valve 100 are open [power is not applied to them];

Stored energy from accumulator 42 is on top of cylinder piston holding cylinder rod 30 in the extended position;

The three manual isolation valves 73, 74 and 75 are opened;

Manual 4-way valve 72 is put in the rod retract position;

The stored energy in the accumulator unseats check valve 144;

Hydraulic fluid flows through check valve 144; and flow control valve 140;

Flow control valve 140 has been adjusted to bleed the accumulator stored energy off slowly;

Hydraulic fluid leaves manifold through port 76 and flows through the manual 4-way valve 72 back to the reservoir 54; this removes the stored energy holding the cylinder in the rod extend position;

The hand pump 70 is operated;

Hydraulic fluid opens and flows through pilot operated check valve 84;

Hydraulic fluid is blocked from returning to the reservoir through the open dump solenoid valve 100 by pilot operated check valve 134;

Hydraulic pressure from pilot operated check valve 84 unseats check ball 87 on pilot operated check valve 86 through pipe conduit 85;

Hydraulic fluid leaves manifold port 36;

Hydraulic fluid in FIG. 1 enters bottom 27 of cylinder in linear actuator forcing piston 28 up [rod retraction];

Hydraulic fluid is forced out of the area on top 25 of the cylinder piston;

Hydraulic fluid enters manifold port 34;

In FIG. 1A hydraulic fluid enters rotary actuator 224 and causes rotary piston 228 to open in direction 230;

Hydraulic fluid passes through pilot operated check valve 86 due to check ball 87 being unseated by pressure from pilot operated check valve 84; and Hydraulic fluid passes through the manual 4 way valve 72 and manual isolation valve 74 back to reservoir 54.

Cylinder rod extends using hand pump—power is not applied to actuator and the following steps occur:

Blocker solenoid valve 104 remains open [no power is applied];

Accumulator solenoid valve 108 and dump solenoid valve 100 are open [power is not applied to them];

Stored energy from accumulator 42 has been bled off during cylinder rod retraction operation discussed above.

The three manual isolation valves 73, 74 and 75 are opened;

Manual 4-way valve 72 is put in the rod extension position;

The hand pump 70 is operated;

Hydraulic fluid opens and flows through pilot operated check valve 86;

Hydraulic fluid is blocked from entering the accumulator 42 through the open blocker solenoid valve 104 and accumulator solenoid valve 108 by pilot operated check valve 132; hydraulic fluid is also blocked from returning to the reservoir through check valve 144 by pilot operated check valve 132;

Hydraulic pressure from pilot operated check valve 86 unseats check ball 83 on pilot operated check valve 84 through fluid flow passageway 85;

Hydraulic fluid leaves manifold port 34;

Hydraulic fluid in FIG. 1 enters top 25 of cylinder in linear actuator forcing piston down [rod extension];

Hydraulic fluid is forced out of the area on the bottom 27 of the cylinder piston 28;

Hydraulic fluid enters manifold port 36;

In FIG. 1A hydraulic fluid enters rotary actuator 224 and causes rotary piston 228 to close in direction 232;

Hydraulic fluid passes through pilot operated check valve 84 due to check ball 83 being unseated by pressure from pilot operated check valve 86 through fluid flow passageway 85; and Hydraulic fluid passes through the manual 4 way valve 72 and manual isolation valve 74 back to reservoir 54.

Figure 10:
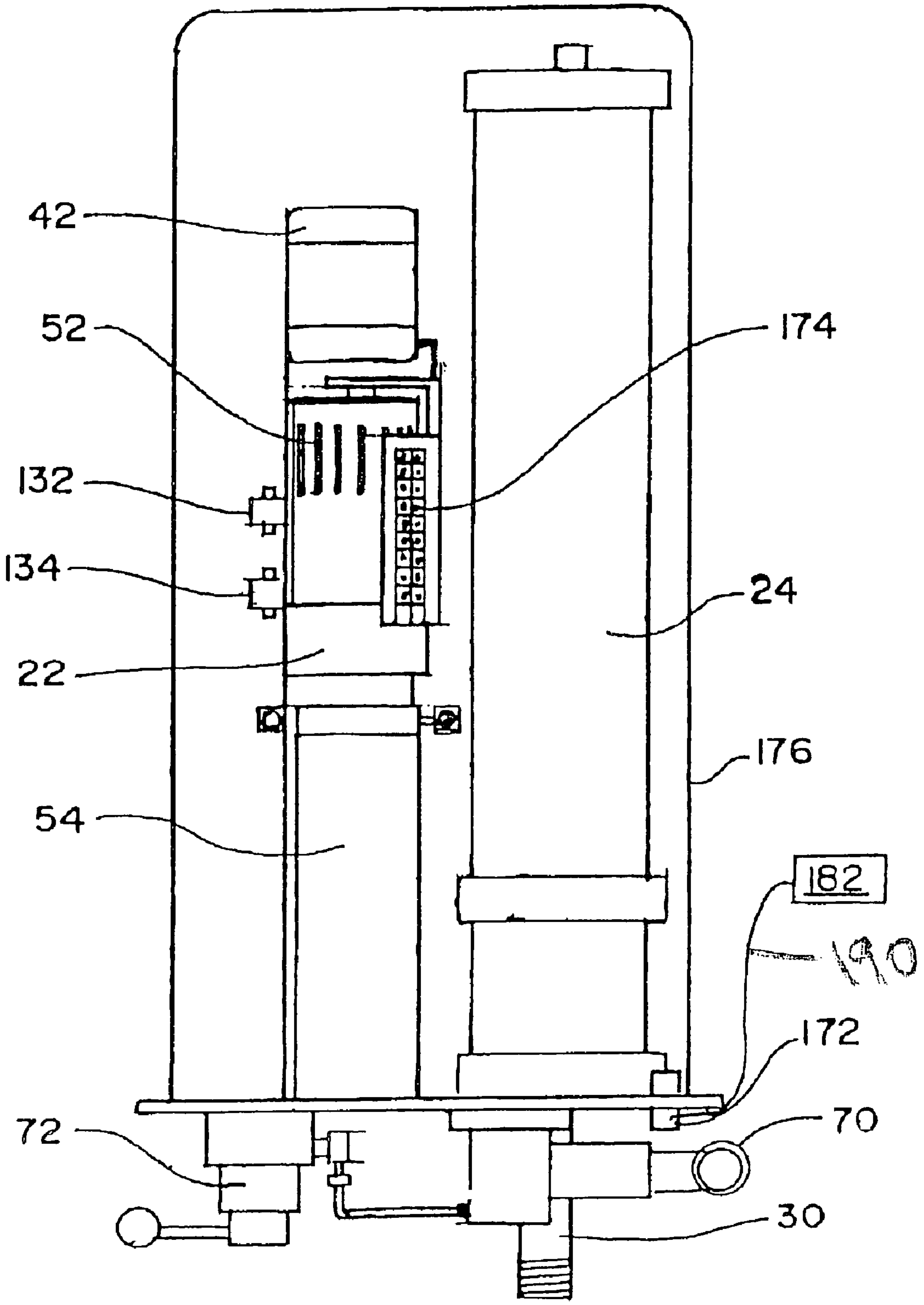
FIG. 10 shows a plan view of an assembled fail safe linear actuator system of the invention.

The manifold block 22 of the present invention is shown in FIG. 10 as part of an actuator system that is contained within a water-tight submersible container 176. The manifold block is made initially from a solid piece of metal such as aluminum, brass, bronze, or stainless steel. Block 22 usually is rectangular in cross-sectional shape along major or longitudinal axis L and/or is usually square in cross-sectional shape along the minor or transverse axis T which is perpendicular to the major axis L. This is shown in FIG. 2. The fluid flow circuit diagram shown in FIG. 1 is produced by known metal working and machining techniques such as drilling and boring. This produces the fluid flow passageways P which are internally connected within the block and which connect together the external openings or ports in the several sides of the block in a fluid tight manner so as to contain the hydraulic fluid. The pressure switches and the solenoid valves are produced in a conventional manner by known manufacturers. The hydraulic fluid used is conventional.

Figure 7:
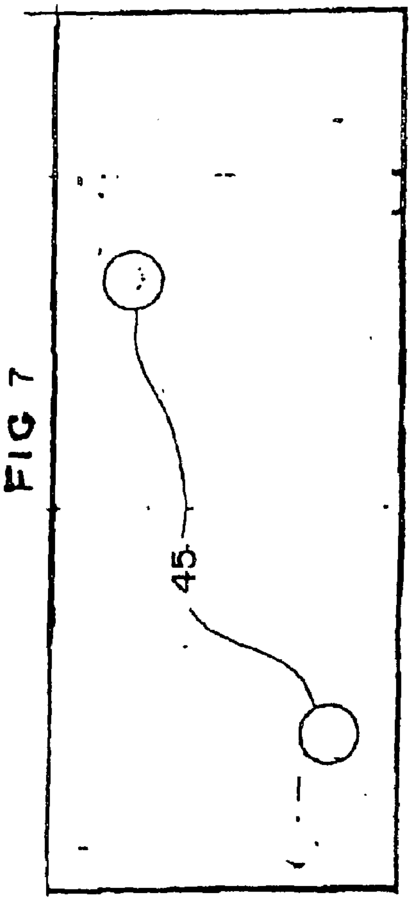
FIG. 7 shows a rear side view of the manifold block in the direction of arrow 7 of FIG. 3 without any switches or valves being attached.

The pressure switches and solenoid valves which are shown in FIGS. 2 and 3 are attached to manifold block 22 by screw threaded means. Thus, the manifold block would have screw threaded portions which are drilled or countersunk openings into the outer surface of the manifold block so as to be a female receptor for attachment. The pressure switch or solenoid valve would have at its base a correspondingly mating screw threaded male protuberance for attaching the switch or valve to the manifold block in a fluid tight coupled manner. FIG. 7 shows openings 45 into which a switch or valve may be attached. Sometimes these openings are temporarily closed in a fluid tight manner by bolts 180 until a switch or valve is attached at a later time, as shown in FIG. 2.

FIG. 10 shows a source of electric power 182. This term "source" can refer to the following possibilities. It can be a means 182 for generating alternating current (a.c.) or a means 182 for providing direct current (d.c.) such as a battery, or it can be the electrical connector 172, or it can be the electrical cable wire 190. The source of electrical power is equally useful for both the linear actuator and the rotary actuator.

As shown in FIG. 1, some of the fluid flow passageways intersect each other such as at points of intersection I. Others of the fluid flow passageways do not intersect such as at locations L. The number of hydraulic connections or ports required without a manifold is 37. The number of hydraulic connections or ports required with the manifold of the present invention is 14, and is a significant improvement.

Although only a few embodiments of the present invention have been shown and described, it is to be understood that many changes and modifications may be made thereunto without departing from the spirit and scope of the invention as defined in the appended claims.

What is claimed is:

1. A fail safe actuator system comprising a valve manifold block having a left side and a right side, said left side having left side openings, and said right side having right side openings; said manifold block having a front side having front side openings; said manifold block having a rear side having rear side openings; said manifold block having a top side having top side openings; and said manifold block having a bottom side having bottom side openings;

fluid flow passageways within said manifold block connecting some of said left side openings with some of said right side openings;

an accumulator connected in fluid flow connection to a right side opening;

an actuator comprising a cylinder containing a moveable piston having an attached piston rod connected to a valve; said actuator cylinder connected in fluid flow connection to some of said left side openings;

said fluid flow passageways within said manifold block connecting some of said front side openings with some of said rear side;

an electrically operated pump motor and a motor driven pump connected in fluid flow connection to a fluid reservoir and connected in fluid flow connection to a solenoid operated control valve; said solenoid operated control valve connected in fluid flow connection to other of said openings;

a manually operated hand pump connected in fluid flow connection to said reservoir and to a manual 4 way valve; said manual 4 way valve connected in fluid flow connection to another of said openings; and a set of pilot operated check valves connected in fluid flow connection to said fluid flow passageways between said motor driven pump and said hand pump; and a source of electrical power;

whereby said actuator can be operated with said hand pump if electrical power is not available; and accumulator flow control valve (124), in which said accumulator flow control valve restricts the hydraulic fluid flow out of the cylinder during accumulator actuation; and when accumulator solenoid (108) and dump solenoid (100) are de-energized, the hydraulic fluid stored under pressure in the accumulator is sent to the to the of the cylinder; and hydraulic fluid forced from the bottom of the cylinder is slowed by said accumulator flow control valve (124) to attain the required operating speed of the cylinder.

2. The fail safe actuator system of claim 1, further comprising two hand pump driven pilot operated check valves (84) and (86), in which these two pilot operated check valves work together during hand pump operation to allow hydraulic fluid flow into and out of the cylinder.

3. The fail safe actuator system of claim 1, further comprising two motor driven pump pilot operated check valves (92) and (94) in which these two pilot operated check valves work together during motor driven pump operation to allow hydraulic fluid flow into and out of the cylinder.

4. The fail safe actuator system of claim 1, further comprising dump solenoid valve (100), in which said dump solenoid valve is closed when electrical power is applied and is open when electrical power is removed; said dump solenoid valve opens on loss of electrical power, allowing a return path for the hydraulic fluid from bottom (27) of the cylinder to a reservoir.

5. The fail safe actuator system of claim 1, further comprising blocker solenoid valve (104) in which said blocker solenoid valve is closed when electrical power is applied and open when electrical power is removed; said blocker solenoid valve is powered and closed when charging said accumulator to block the flow of hydraulic fluid to the cylinder.

6. The fail safe actuator system of claim 1, further comprising accumulator solenoid valve (108), in which said accumulator solenoid valve is closed when electrical power is applied and open when electrical power is removed; said accumulator solenoid valve opens on loss of electrical power, allowing the flow of hydraulic fluid from the accumulator to the top of the cylinder through port (34).

7. The fail safe actuator system of claim 1, further comprising flow control valve (112) for piston rod retraction in which said flow control valve allows full flow to the top of the cylinder through port (34) and has a variable restriction (114) on flow out of the cylinder;

said restriction of the flow out of the cylinder prevents the cylinder piston from being pushed faster than intended by the load on the cylinder rod.

8. The fail safe actuator system of claim 1, further comprising flow control valve (118) for piston rod extension, in which said flow control valve (118) allows full hydraulic fluid flow to the bottom of the cylinder through port (36) and has a variable restriction (120) on the flow out of the cylinder;

said restriction of the flow out of the cylinder prevents the cylinder piston from being pushed faster than intended by the load on the cylinder rod.

9. The fail safe actuator system of claim 1, further comprising accumulator drain valve (128), in which said accumulator drain valve is used to drain the stored energy from the accumulator for servicing.

10. The fail safe actuator system of claim 1, further comprising rod extension adjustable pressure switch (148), in which said adjustable pressure switch (148) shuts off the motor driven pump at the desired pressure; and this pressure is determined by the operating load on the cylinder during rod extension.

11. The fail safe actuator system of claim 1, further comprising rod retraction adjustable pressure switch (152), in which said adjustable pressure switch (152) shuts off the motor driven pump at the desired pressure; and this pressure is determined by the operating load on the cylinder during rod retraction.

12. The fail safe actuator system of claim 1, further comprising accumulator adjustable pressure switch (156), in which said adjustable pressure switch (156) shuts off the motor driven pump at the desired pressure; and this pressure is determined by the pressure required in the accumulator.

13. The fail safe actuator system of claim 1, further comprising pressure gauges (160), (162), and (164), which are used to test pressure during rod extension (160), during rod retraction (162) and in the accumulator (164).

14. A fail safe actuator system comprising a valve manifold block having a left side and a right side, said left side having left side openings, and said right side having right side openings; said manifold block having a front side having front side openings; said manifold block having a rear side having rear side openings; said manifold block having a top side having top side openings; and said manifold block having a bottom side having bottom side openings;

fluid flow passageways within said manifold block connecting some of said left side openings with some of said right side openings;

an accumulator connected in fluid flow connection to a right side opening;

an actuator comprising a cylinder containing a moveable piston having an attached piston rod connected to a valve; said actuator cylinder connected in fluid flow connection to some of said left side openings;

said fluid flow passageways within said manifold block connecting some of said front side openings with some of said rear side;

an electrically operated pump motor and a motor driven pump connected in fluid flow connection to a fluid reservoir and connected in fluid flow connection to a solenoid operated control valve; said solenoid operated control valve connected in fluid flow connection to other of said openings;

a manually operated hand pump connected in fluid flow connection to said reservoir and to a manual 4 way valve; said manual 4 way valve connected in fluid flow connection to another of said openings; and a set of pilot operated check valves connected in fluid flow connection to said fluid flow passageways between said motor driven pump and said hand pump; and a source of electrical power;

whereby said actuator can be operated with said hand pump if electrical power is not available; and two loss of power isolation pilot operated check valves (132) and (134), in which these two pilot operated check valves are used with the hand pump during electrical power failures; said valves prevent the flow of hydraulic fluid from going into the accumulator or returning to the reservoir through the dump solenoid (100).

15. A fail safe actuator system comprising a valve manifold block having a left side and a right side, said left side having left side openings, and said right side having right side openings; said manifold block having a front side having front side openings; said manifold block having a rear side having rear side openings; said manifold block having a top side having top side openings; and said manifold block having a bottom side having bottom side openings;

fluid flow passageways within said manifold block connecting some of said left side openings with some of said right side openings;

an accumulator connected in fluid flow connection to a right side opening;

an actuator comprising a cylinder containing a moveable piston having an attached piston rod connected to a valve; said actuator cylinder connected in fluid flow connection to some of said left side openings;

said fluid flow passageways within said manifold block connecting some of said front side openings with some of said rear side;

an electrically operated pump motor and a motor driven pump connected in fluid flow connection to a fluid reservoir and connected in fluid flow connection to a solenoid operated control valve; said solenoid operated control valve connected in fluid flow connection to other of said openings;

a manually operated hand pump connected in fluid flow connection to said reservoir and to a manual 4 way valve; said manual 4 way valve connected in fluid flow connection to another of said openings; and a set of pilot operated check valves connected in fluid flow connection to said fluid flow passageways between said motor driven pump and said hand pump; and a source of electrical power;

whereby said actuator can be operated with said hand pump if electrical power is not available; and loss of power accumulator drain valve (140), in which said valve (140) allows the slow release of the stored energy in the accumulator when the hand pump is used during loss of electrical power; during electrical power loss, the accumulator solenoid (108) is open applying hydraulic pressure to the top of the cylinder; and said pressure prevents the hand pump from retracting the cylinder rod.

16. A fail safe actuator system comprising a valve manifold block having a left side and a right side, said left side having left side openings, and said right side having right side openings; said manifold block having a front side having front side openings; said manifold block having a rear side having rear side openings; said manifold block having a top side having top side openings; and said manifold block having a bottom side having bottom side openings;

fluid flow passageways within said manifold block connecting some of said left side openings with some of said right side openings;

an accumulator connected in fluid flow connection to a right side opening;

an actuator comprising a cylinder containing a moveable piston having an attached piston rod connected to a valve; said actuator cylinder connected in fluid flow connection to some of said left side openings;

said fluid flow passageways within said manifold block connecting some of said front side openings with some of said rear side;

an electrically operated pump motor and a motor driven pump connected in fluid flow connection to a fluid reservoir and connected in fluid flow connection to a solenoid operated control valve; said solenoid operated control valve connected in fluid flow connection to other of said openings;

a manually operated hand pump connected in fluid flow connection to said reservoir and to a manual 4 way valve: said manual 4 way valve connected in fluid flow connection to another of said openings; and a set of pilot operated check valves connected in fluid flow connection to said fluid flow passageways between said motor driven pump and said hand pump; and a source of electrical power;

whereby said actuator can be operated with said hand pump if electrical power is not available; and loss of power check valve (144), in which said check valve (144) prevents the hydraulic fluid flow from the hand pump from going into the accumulator during rod extension operation.

17. A fail safe actuator system comprising a valve manifold block having several sides with each side of said several sides having openings;

fluid flow passageways within said manifold block connecting some of said openings of each side with some of said openings of every other side;

an accumulator connected in fluid flow connection to at least one of said openings;

an actuator comprising a cylinder containing a moveable piston having an attached piston rod connected to a valve; said actuator cylinder connected in fluid flow connection to others of said openings;

an electrically operated pump motor and a motor-driven pump connected in fluid flow connection to a fluid reservoir and connected in fluid flow connection to a solenoid operated control valve; said solenoid operated control valve connected in fluid flow connection to still other of said openings;

a manually operated hand pump connected in fluid flow connection to said reservoir and to a manual 4 way valve; said manual 4 way valve connected in fluid flow connection to further others of said openings; and a set of pilot operated check valves connected in fluid flow connection to said fluid flow passageways between said motor driven pump and said hand pump; and whereby said actuator can be operated with said hand pump if electrical power is not available; and two loss of power isolation pilot operated check valves (132) and (134), in which these two pilot operated check valves are used with the hand pump during electrical power failures; said valves prevent the flow of hydraulic fluid from going into the accumulator or returning to the reservoir through the dump solenoid (100).

18. A fail safe actuator system comprising a valve manifold block having several sides with each side of said several sides having openings;

fluid flow passageways within said manifold block connecting some of said openings of each side with some of said openings of every other side;

an accumulator connected in fluid flow connection to at least one of said openings;

an actuator comprising a cylinder containing a moveable piston having an attached piston rod connected to a valve; said actuator cylinder connected in fluid flow connection to others of said openings;

an electrically operated pump motor and a motor-driven pump connected in fluid flow connection to a fluid reservoir and connected in fluid flow connection to a solenoid operated control valve; said solenoid operated control valve connected in fluid flow connection to still other of said openings;

a manually operated hand pump connected in fluid flow connection to said reservoir and to a manual 4 way valve; said manual 4 way valve connected in fluid flow connection to further others of said openings; and a set of pilot operated check valves connected in fluid flow connection to said fluid flow passageways between said motor driven pump and said hand pump; and whereby said actuator can be operated with said hand pump if electrical power is not available; and accumulator flow control valve (124), in which said accumulator flow control valve restricts the hydraulic fluid flow out of the cylinder during accumulator actuation; and when accumulator solenoid (108) and dump solenoid (100) are de-energized, the hydraulic fluid stored under pressure in the accumulator is sent to the top of the cylinder; and hydraulic fluid forced from the bottom of the cylinder is slowed by said accumulator flow control valve (124) to attain the required operating speed of the cylinder.

19. The fail safe actuator system of claim 18, further comprising two hand pump driven pilot operated check valves (84) and (86), in which these two pilot operated check valves work together during hand pump operation to allow hydraulic fluid flow into and out of the cylinder.

20. The fail safe actuator system of claim 18, further comprising two motor driven pump pilot operated check valves (92) and (94), in which these two pilot operated check valves work together during motor driven pump operation to allow hydraulic fluid flow into and out of the cylinder.

21. The fail safe actuator system of claim 18, further comprising dump solenoid valve (100), in which said dump solenoid valve is closed when electrical power is applied and is open when electrical power is removed; said dump solenoid valve opens on loss of electrical power, allowing a return path for the hydraulic fluid from bottom (27) of the cylinder to a reservoir.

22. The fail safe actuator system of claim 18, further comprising blocker solenoid valve (104) in which said blocker solenoid valve is closed when electrical power is applied and open when electrical power is removed; said blocker solenoid valve is powered and closed when charging said accumulator to block the flow of hydraulic fluid to the cylinder.

23. The fail safe actuator system of claim 18, further comprising accumulator solenoid valve (108), in which said accumulator solenoid valve is closed when electrical power is applied and open when electrical power is removed; said accumulator solenoid valve opens on loss of electrical power, allowing the flow of hydraulic fluid from the accumulator to the top of the cylinder through port (34).

24. The fail safe actuator system of claim 18, further comprising flow control valve (112) for piston rod retraction in which said flow control valve allows full flow to the top of the cylinder through port (34) and has a variable restriction (114) on flow out of the cylinder;

said restriction of the flow out of the cylinder prevents the cylinder piston from being pushed faster than intended by the load on the cylinder rod.

25. The fail safe actuator system of claim 18, further comprising flow control valve (118) for piston rod extension, in which said flow control valve (118) allows full hydraulic fluid flow to the bottom of the cylinder through port (36) and has a variable restriction (120) on the flow out of the cylinder;

said restriction of the flow out of the cylinder prevents the cylinder piston from being pushed faster than intended by the load on the cylinder rod.

26. The fail safe actuator system of claim 18, further comprising accumulator drain valve (128), in which said accumulator drain valve is used to drain the stored energy from the accumulator for servicing.

27. The fail safe actuator system of claim 18, further comprising rod extension adjustable pressure switch (148), in which said adjustable pressure switch (148) shuts off the motor driven pump at the desired pressure; and this pressure is determined by the operating load on the cylinder during rod extension.

28. The fail safe actuator system of claim 18, further comprising rod retraction adjustable pressure switch (152), in which said adjustable pressure switch (152) shuts off the motor driven pump at the desired pressure; and this pressure is determined by the operating load on the cylinder during rod retraction.

29. The fail safe actuator system of claim 18, further comprising accumulator adjustable pressure switch (156), in which said adjustable pressure switch (156) shuts off the motor driven pump at the desired pressure; and this pressure is determined by the pressure required in the accumulator.

30. The fail safe actuator system of claim 18, further comprising pressure guages (160), (162), and (164), which are used to test pressure during rod extension (160), during rod retraction (162) and in the accumulator (164).

31. The fail safe actuator system of claim 18, further comprising a source of electrical power.

32. The fail safe actuator system of claim 18, wherein the actuator is a linear actuator.

33. The fail safe actuator system of claim 18, wherein the actuator is a rotary actuator.

34. A fail safe actuator system comprising a valve manifold block having several sides with each side of said several sides having openings;

fluid flow passageways within said manifold block connecting some of said openings of each side with some of said openings of every other side;

an accumulator connected in fluid flow connection to at least one of said openings;

an actuator comprising a cylinder containing a moveable piston having an attached piston rod connected to a valve; said actuator cylinder connected in fluid flow connection to others of said openings;

an electrically operated pump motor and a motor-driven pump connected in fluid flow connection to a fluid reservoir and connected in fluid flow connection to a solenoid operated control valve; said solenoid operated control valve connected in fluid flow connection to still other of said openings;

a manually operated hand pump connected in fluid flow connection to said reservoir and to a manual 4 way valve; said manual 4 way valve connected in fluid flow connection to further others of said openings; and a set of pilot operated check valves connected in fluid flow connection to said fluid flow passageways between said motor driven pump and said hand pump; and whereby said actuator can be operated with said hand pump if electrical power is not available; and loss of power accumulator drain valve (140), in which said valve (140) allows the slow release of the stored energy in the accumulator when the hand pump is used during loss of electrical power; during electrical power loss, the accumulator solenoid (108) is open applying hydraulic pressure to the top of the cylinder; and said pressure prevents the hand pump from retracting the cylinder rod.

35. A fail safe actuator system comprising a valve manifold block having several sides with each side of said several sides having openings;

fluid flow passageways within said manifold block connecting some of said openings of each side with some of said openings of every other side;

an accumulator connected in fluid flow connection to at least one of said openings;

an actuator comprising a cylinder containing a moveable piston having an attached piston rod connected to a valve; said actuator cylinder connected in fluid flow connection to others of said openings;

an electrically operated pump motor and a motor-driven pump connected in fluid flow connection to a fluid reservoir and connected in fluid flow connection to a solenoid operated control valve; said solenoid operated control valve connected in fluid flow connection to still other of said openings;

a manually operated hand pump connected in fluid flow connection to said reservoir and to a manual 4 way valve; said manual 4 way valve connected in fluid flow connection to further others of said openings; and a set of pilot operated check valves connected in fluid flow connection to said fluid flow passageways between said motor driven pump and said hand pump; and whereby said actuator can be operated with said hand pump if electrical power is not available; and loss of power check valve (144), in which said check valve (144) prevents the hydraulic fluid flow from the hand pump from going into the accumulator during rod extension operation.

* * * * *

UNITED STATES PATENT AND TRADEMARK OFFICE

CERTIFICATE OF CORRECTION

PATENT NO. : 7,591,133 B2
APPLICATION NO. : 11/325370
DATED : September 22, 2009
INVENTOR(S) : John J. Wright It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 628 days.

Signed and Sealed this

Twenty-first Day of September, 2010

David J. Kappos

*Director of the United States Patent and Trademark Office*